(12) United States Patent
Yoshimura et al.

(10) Patent No.: US 6,509,120 B1
(45) Date of Patent: Jan. 21, 2003

(54) LITHIUM BATTERY WITH BORON-CONTAINING LITHIUM-MANGANESE COMPLEX OXIDE CATHODE MATERIAL

(75) Inventors: Seiji Yoshimura, Hirakata (JP); Taeko Ota, Osaka (JP); Shin Fujitani, Hirakata (JP); Nobuhiro Nishiguchi, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 60 days.

(21) Appl. No.: 09/630,657

(22) Filed: Aug. 1, 2000

(30) Foreign Application Priority Data

Aug. 4, 1999 (JP) ............................................. 11-220596

(51) Int. Cl.⁷ ............................................. H01M 10/24
(52) U.S. Cl. .................. 429/231.95; 429/331; 252/62.2
(58) Field of Search ........................... 429/231.95, 188, 429/324, 331; 252/62.2

(56) References Cited

U.S. PATENT DOCUMENTS

| 5,578,395 A | * | 11/1996 | Yoshimura et al. ......... 429/197 |
| 5,958,624 A | * | 9/1999 | Frech et al. ............ 429/231.95 |
| 5,993,998 A | * | 11/1999 | Yasuda .................. 429/231.95 |

* cited by examiner

*Primary Examiner*—Patrick Ryan
*Assistant Examiner*—M. Wills
(74) *Attorney, Agent, or Firm*—Armstrong, Westerman & Hattori, LLP

(57) ABSTRACT

A lithium battery comprising a positive electrode comprising a positive-electrode active material of boron-containing lithium-manganese complex oxide, a negative electrode and a nonaqueous electrolyte containing a solute and a solvent, the positive-electrode active material is the boron-containing lithium-manganese complex oxide having a boron-to-manganese atomic ratio (B/Mn) in the range of 0.01 to 0.20 and a predischarge mean manganese valence of not less than 3.80

13 Claims, 1 Drawing Sheet

LITHIUM BATTERY WITH BORON-CONTAINING LITHIUM-MANGANESE COMPLEX OXIDE CATHODE MATERIAL

BACKGROUND OF THE INVENTION

1. Field of the Invention

The present invention relates to a lithium battery comprising a positive electrode comprising a positive-electrode active material of boron-containing lithium-manganese complex oxide, a negative electrode, and a nonaqueous electrolyte containing a solute and a solvent, and more particularly, to a lithium battery improved in charge/discharge cycle performance through suppression of reaction between the positive-electrode active material and the nonaqueous electrolyte.

2. Description of the Related Art

Recently, rechargeable batteries have found applications in various fields such as electronics. As a novel battery of high power and high energy density, in particular, lithium batteries featuring high electromotive force derived from oxidation/reduction of lithium in the nonaqueous electrolyte have come into wide use.

Such lithium batteries have conventionally employed various metal oxides capable of absorbing and desorbing lithium ions, as the positive-electrode active material for use in the positive electrode. More recently, studies have been made on the use of manganese oxides, such as manganese dioxide, as the positive-electrode active material of the lithium battery because manganese oxides generally provide high discharge potentials and are inexpensive.

Unfortunately, in charge/discharge processes of the lithium battery including the positive-electrode active material of manganese oxide, the manganese oxide is repeatedly expanded and contracted so that the crystal structure thereof is destroyed. As a result, the battery suffers degraded charge/discharge cycle performance.

In recent attempts to improve the charge/discharge cycle performance of the lithium battery including the positive-electrode active material of manganese oxide, a variety of positive-electrode active materials have been proposed. For instance, Japanese Unexamined Patent Publication No.63-114064(1988) discloses a positive-electrode active material comprising a lithium-manganese complex oxide obtained from manganese dioxide and $Li_2MnO_3$. Japanese Unexamined Patent Publication No.1-235158 (1989) provides a positive-electrode active material comprising a complex oxide of lithium-containing manganese dioxide wherein lithium is incorporated in the crystal lattice of manganese dioxide. Further, Japanese Unexamined Patent Publication Nos.4-237970(1992) and 9-265984(1997) disclose positive-electrode active materials comprising lithium-manganese complex oxides with boron added thereto.

Although the lithium batteries using the positive-electrode active materials of the official gazettes are improved in the charge/discharge cycle performance to some degree, there still exists a problem that the positive-electrode active material reacts with the nonaqueous electrolyte in the battery, degrading the charge/discharge cycle performance. On the other hand, the recent electronics with higher performances demand a lithium battery further improved in the charge/discharge cycle performance.

SUMMARY OF THE INVENTION

The invention is directed to a lithium battery comprising a positive electrode comprising a positive-electrode active material of boron-containing lithium-manganese complex oxide, a negative electrode, and a nonaqueous electrolyte containing a solute and a solvent, the battery adapted to suppress the reaction between the positive-electrode active material and the nonaqueous electrolyte for achieving excellent charge/discharge cycle performance.

A lithium battery according to the invention comprises a positive electrode comprising a positive-electrode active material of boron-containing lithium-manganese complex oxide, a negative electrode, and a nonaqueous electrolyte containing a solute and a solvent, wherein the positive-electrode active material is a boron-containing lithium-manganese complex oxide having an atomic ratio(B/Mn) of boron B to manganese Mn in the range of 0.01 to 0.20 and a predischarge mean manganese valence of not less than 3.80, and wherein the solute in the nonaqueous electrolyte includes at least one substance selected from the group consisting of lithium trifluoromethanesulfonimide, lithium pentafluoroethanesulfonimide and lithium trifluoromethanesulfonmethide whereas the solvent in the nonaqueous electrolyte is a solvent mixture containing at least one organic solvent selected from the group consisting of ethylene carbonate, propylene carbonate, butylene carbonate, vinylene carbonate, γ-butyrolactone and sulfolane and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate.

In the inventive lithium battery wherein the positive electrode comprises the positive-electrode active material of boron-containing lithium-manganese complex oxide while the nonaqueous electrolyte comprises the above solvent mixture with the above solute dissolved therein, boron contained in the positive-electrode active material suppresses the reaction of the lithium-manganese complex oxide with the nonaqueous electrolyte in the charging process. This prevents the dissolution of the positive-electrode active material in the nonaqueous electrolyte thereby to suppress the increase of internal resistance of the lithium battery. It is also believed that the nonaqueous electrolyte is increased in ionic conductivity thereby contributing to the improved charge/discharge cycle performance of the lithium battery. From the standpoint of suppressing the reaction between the positive-electrode active material and the nonaqueous electrolyte in the charging process, it is preferred for the solvent mixture of the nonaqueous electrolyte to contain the two types of organic solvents in respective concentrations of not less than 10 vol %.

It is for the following reasons that the inventive lithium battery employs, as the positive-electrode active material, the boron-containing lithium-manganese complex oxide with the atomic ratio (B/Mn) of boron B to manganese Mn in the range of 0.01 to 0.20. With the B/Mn ratio of less than 0.01, boron is contained in the positive-electrode active material in too small a concentration to accomplish an adequate suppression of the reaction between the lithium-manganese complex oxide and the nonaqueous electrolyte during the charging process. With the B/Mn ratio in excess of 0.20, on the other hand, boron uninvolved in the charge/discharge process accounts for too great a portion, thus failing to be properly incorporated into the lithium-manganese complex oxide solid. As a result, the positive-electrode active material suffers an instable crystal structure, tending to react with the nonaqueous electrolyte. In both of the above cases, the lithium battery is degraded in the charge/discharge cycle performance.

It is for the following reason that the inventive lithium battery employs, as the positive-electrode active material, the boron-containing lithium-manganese complex oxide having the predischarge mean manganese valence of 3.80 or more. If the complex oxide has a predischarge mean manganese valence of less than 3.80, the mean valence of manganese jumps from less than 3.80 to the order of 4 during the discharge process, resulting in great fluctuations of the mean manganese valence. This leads to the instable crystal structure of the positive-electrode active material which, in turn, tends to react with the nonaqueous electrolyte. Hence, the lithium battery is degraded in the charge/discharge cycle performance.

If the nonaqueous electrolyte employs the solute of lithium trifluoromethanesulfonimide or the solvent mixture containing at least one organic solvent selected from the group consisting of propylene carbonate, ethylene carbonate and butylene carbonate, and 1,2-dimethoxyethane, particularly a mixture of propylene carbonate and 1,2-dimethoxyethane, the inventive lithium battery may be further improved in the charge/discharge cycle performance because of enhanced suppression of the reaction between the nonaqueous electrolyte and the positive-electrode active material.

In the inventive lithium battery, the boron-containing lithium-manganese complex oxide as the positive-electrode active material may be obtained by heat-treatment of a mixture of a boron compound, lithium compound and manganese compound in the presence of oxygen, the mixture containing boron, lithium and manganese in an atomic ratio (B:Li:Mn) of 0.01–0.20:0.1–2.0:1.

Examples of a usable boron compound in the preparation of the positive-electrode active material include boron oxide $B_2O_3$, boric acid $H_3BO_3$, metaboric acid $HBO_2$, lithium metaborate $LiBO_2$, quaternary lithium borate $Li_2B_4O_7$ and the like. Examples of a usable lithium compound include lithium hydroxide LiOH, lithium carbonate $Li_2CO_3$, lithium oxide $Li_2O$, lithium nitrate $LiNO_3$ and the like. Examples of a usable manganese compound include manganese dioxide $MnO_2$, manganese oxyhydroxide MnOOH and the like.

In the heat-treatment of the boron compound, lithium compound and manganese compound for giving the positive-electrode active material, temperatures below 150° C. will result in insufficient incorporation of boron or boron compound into the solid of the lithium-manganese complex oxide and also in insufficient removal of water of crystallization of manganese dioxide. The residual water of crystallization reacts with lithium so as to degrade storability of the lithium battery. On the other hand, heat-treatment temperatures in excess of 430° C. will result in decomposed manganese dioxide so that the complex oxide presents a predischarge mean manganese valence of less than 3.80. Hence, as mentioned supra, the crystal structure of the positive-electrode active material becomes instable because of the great fluctuations in the mean manganese valence during the charging process. Thus, the positive-electrode active material is prone to react with the nonaqueous electrolyte, degrading the charge/discharge cycle performance of the lithium battery. Therefore, in the preparation of the positive-electrode active material, the boron compound, lithium compound and manganese compound may be heat-treated at temperatures of 150° C. to 430° C., preferably of 250° C. to 430° C., or more preferably of 300° C. to 430° C.

If the heat-treatment is performed in such a manner, boron or the boron compound is properly incorporated into the solid of the lithium-manganese complex oxide without altering the crystal structure thereof. Thus is maintained the crystal structure combining $Li_2MnO_3$ and $MnO_2$ and featuring excellent charge/discharge cycle performance.

In the inventive lithium battery, examples of a usable negative-electrode active material in the negative electrode include lithium metals generally used in the art; lithium alloys such as lithium-aluminum alloy, lithium-lead alloy, lithium-tin alloy and the like; and carbon materials capable of absorbing and desorbing lithium ions such as graphite, coke and the like. Where the negative-electrode active material is a lithium-aluminum alloy, the nonaqueous electrolyte forms an ion conductive film over a surface of the negative-electrode active material. The film serves to suppress the reaction of the negative-electrode active material with the nonaqueous electrolyte, thereby further improving the charge/discharge cycle performance of the lithium battery.

These and other objects, advantages and features of the invention will become apparent from the following description thereof taken in conjunction with the accompanying drawing which illustrates a specific embodiment of the invention.

DESCRIPTION OF THE PREFERRED EMBODIMENTS

Figure 1:
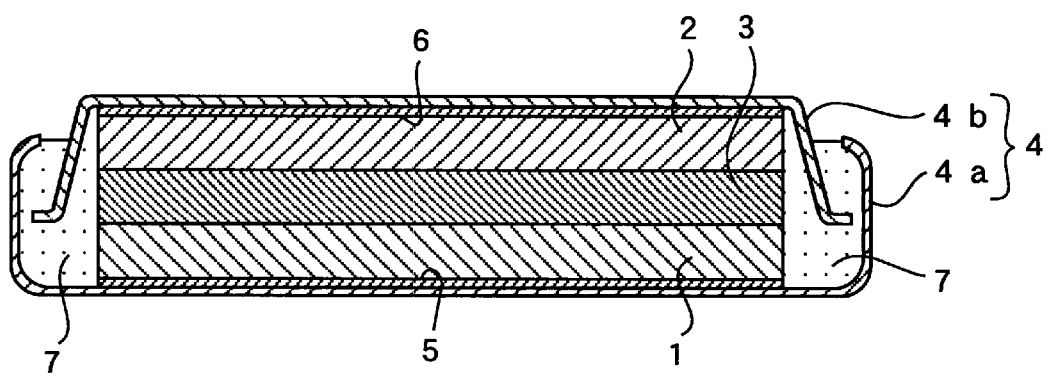
FIG. 1 is a sectional view explanatory of an internal construction of a lithium battery fabricated in inventive examples and comparative examples.

Now, the lithium battery according to the invention will be described in detail by way of specific examples thereof while comparative examples will be cited to demonstrate that the examples of the inventive lithium battery are improved in the charge/discharge cycle performance. It is to be noted that the lithium battery of the invention is not limited to the following examples and suitable modifications may be made thereto within the scope of the invention.

Example 1

In Example 1, a positive electrode 1 and a negative electrode 2 were fabricated in the following manners while a nonaqueous electrolyte was prepared as follows. Then, a flat coin-type lithium battery was fabricated as shown in FIG. 1.

Fabrication of Positive Electrode

The positive electrode was fabricated as follows. First, there was prepared a mixture of lithium hydroxide LiOH, boron oxide $B_2O_3$ and manganese dioxide $MnO_2$ containing lithium, boron and manganese in an atomic ratio (Li:B:Mn) of 0.53:0.06:1.00. The resultant mixture was subjected to 20-hour heat-treatment at 375° C. in the atmosphere. The mixture was then ground to give a powdery positive-electrode active material of boron-containing lithium-manganese complex oxide.

The resultant complex oxide exhibited a mean manganese valence of 3.80. The mean valence of manganese in the complex oxide was determined as follows. A solution was prepared by dissolving the powdery boron-containing lithium-manganese complex oxide in hydrochloric acid. The concentration of manganese in the solution was determined by atomic absorption spectrochemical analysis. On the other hand, an aqueous solution of ammonium ferrous sulfate was admixed to the solution thus prepared. The resultant solution mixture was subjected to chemical titration where excess ammonium ferrous sulfate was titrated with an aqueous solution of potassium permanganate thereby to determine an actual concentration of oxygen in the above solution, which indicated an oxidizability of manganese. The mean valence of manganese was calculated using the data thus obtained.

Further, the boron-containing lithium-manganese complex oxide was subjected to X-ray diffraction analysis. The X-ray diffraction pattern showed a peak of $Li_2MnO_3$ and a peak of $MnO_2$ which was slightly shifted to the lower angle side from the inherent peak position.

It is believed that because of lithium incorporated into the $MnO_2$ solid, manganese presented the mean valence of 3.80, which is less than 4, while the $MnO_2$ peak was shifted to the lower angle side in the X-ray diffraction pattern.

Next, the powdery boron-containing lithium-manganese complex oxide, as the positive-electrode active material, a powdery carbon black as a conductive agent, and a powdery polytetrafluoroethylene as a binder were blended together in a weight ratio of 85:10:5. The resultant positive-electrode active mixture was cast into disc which was dried in vacuum at 250° C. for two hours. Thus was obtained the positive electrode.

Fabrication of Negative Electrode

The negative electrode was prepared by punching out a disc from a lithium-aluminum alloy sheet electrochemically produced.

Preparation of Nonaqueous Electrolyte

The nonaqueous electrolyte was prepared as follows. A solvent mixture was prepared by blending propylene carbonate (PC) and 1,2-dimethoxyethane (DME) in a volume ratio of 1:1. Then, lithium trifluoromethanesulfonimide LiN$(CF_3SO_2)_2$, as a solute, was dissolved in the resultant solvent mixture in a concentration of 1 mol/l.

Fabrication of Battery

A flat coin-type lithium battery having a diameter of 24 mm and a thickness of 3 mm was fabricated in the following manner. A separator 3 was prepared by immersing a polypropylene porous film in the above nonaqueous electrolyte. As shown in FIG. 1, the separator 3 was sandwiched between the positive electrode 1 and negative electrode 2 and placed in a battery case 4 consisting of a positive electrode can 4a and a negative electrode can 4b. The positive electrode 1 was connected to the positive electrode can 4a via a positive electrode collector 5 formed of a stainless sheet (SUS316) whereas the negative electrode 2 was connected to the negative electrode can 4b via a negative electrode collector 6 formed of a stainless sheet (SUS304). The positive electrode can 4a and negative electrode can 4b were electrically isolated from each other by means of a polypropylene insulation packing 7. A precharge internal resistance of the lithium battery was determined to be about 10Ω.

Examples 2, 3

Examples 2, 3 were different from Example 1 only in the type of solute used for the nonaqueous electrolyte. As shown in Table 1 below, Example 2 used lithium pentafluoroethanesulfonimide LiN$(C_2F_5SO_2)_2$ whereas Example 3 used lithium trifluoromethanesulfonmethide LiC$(CF_3SO_2)_3$. Except for this, the same procedure as in Example 1 was taken to fabricate the respective lithium batteries of Examples 2 and 3.

Comparative Examples 1–5

Comparative Examples 1 to 5 were different from Example 1 only in the type of solute used for the nonaqueous electrolyte. As shown in Table 1 below, Comparative Example 1 used lithium trifluoromethanesulfonate LiCF$_3$SO$_3$, Comparative Example 2 used lithium hexafluorophosphate LiPF$_6$, Comparative Example 3 used lithium tetrafluoroborate LiBF$_4$, Comparative Example 4 used lithium hexafluoroarsenate LiAsF$_6$, and Comparative Example 5 used lithium perchlorate LiClO$_4$. Except for this, the same procedure as in Example 1 was taken to fabricate the respective lithium batteries.

The lithium batteries of Examples 1 to 3 and Comparative Example 1 to 5 were each charged and discharged in cycles, each cycle consisting of charging at 10 mA charge current to a charge end voltage of 3.2 V followed by discharging at 10 mA discharge current to a discharge end voltage of 2.0 V. Each battery was determined for the initial discharge capacity at cycle 1 as well as the number of cycles before a discharge capacity decline to less than half the initial discharge capacity. The results are listed in Table 1 as below.

TABLE 1

| | solute in nonaqueous electrolyte | number of cycles |
| --- | --- | --- |
| example 1 | LiN(CF$_3$SO$_2$)$_2$ | 55 |
| example 2 | LiN(C$_2$F$_5$SO$_2$)$_2$ | 52 |
| example 3 | LiC(CF$_3$SO$_2$)$_3$ | 50 |
| comparative example 1 | LiCF$_3$SO$_3$ | 26 |
| comparative example 2 | LiPF$_6$ | 29 |
| comparative example 3 | LiBF$_4$ | 21 |
| comparative example 4 | LiAsF$_6$ | 23 |
| comparative example 5 | LiClO$_4$ | 19 |

As apparent from the results, the lithium batteries of Examples 1 to 3 with the nonaqueous electrolyte containing the solute of LiN(CF$_3$SO$_2$)$_2$, LiN(C$_2$F$_5$SO$_2$)$_2$ or LiC(CF$_3$So$_2$)$_3$ have attained greater improvement in the charge/discharge cycle performance with notable increase in the number of cycles before the decline to less than half the initial discharge capacity, as compared to those of Comparative Examples 1 to 5 with the nonaqueous electrolyte containing the solute of LiCF$_3$SO$_3$, LiPF$_6$, LiBF$_4$, LiAsF$_6$ or LiClO$_4$.

According to a comparison among the batteries of Examples 1 to 3, Example 1 with the nonaqueous electrolyte containing the solute of LiN(CF$_3$SO$_2$)$_2$ presents a greater number of cycles abovementioned, thus attaining an even greater improvement in the charge/discharge cycle performance than Examples 2 and 3 with the nonaqueous electrolyte containing the solute of LiN(C$_2$F$_5$SO$_2$)$_2$ or LiC(CF$_3$SO$_2$)$_3$.

Examples 4 to 7

Examples 4 to 7 were different from Example 1 in that the positive-electrode active materials of boron-containing lithium-manganese complex oxides were prepared using lithium hydroxide LiOH, boron oxide $B_2O_3$ and manganese dioxide $MnO_2$ in varied mixing ratios. As shown in Table 2 below, Example 4 blended these ingredients in an atomic ratio (Li:B:Mn) of 0.505:0.01:1; Example 5 blended them at an atomic ratio of 0.51:0.02:1; Example 6 blended them at an atomic ratio of 0.55:0.10:1; and Example 7 blended them at an atomic ratio of 0.60:0.20:1. Except for this, the same procedure as in Example 1 was taken to fabricate the respective positive electrodes. Incidentally, all the resultant boron-containing lithium-manganese complex oxides presented the mean manganese valence of 3.80, similarly to that of Example 1.

Using the resultant positive electrodes, lithium batteries of Examples 4 to 7 were fabricated the same way as in Example 1.

Comparative Example 6

Comparative Example 6 took the same procedure as in Example 1 to fabricate a positive electrode except that a positive-electrode active material contained a mixture of lithium hydroxide LiOH and manganese dioxide $MnO_2$ in an atomic ratio (Li:Mn) of 0.50:1, thus dispensing with a boron compound.

Using the resultant positive electrode, a lithium battery of Comparative Example 6 was fabricated the same way as in Example 1.

Similarly to Examples 1 to 3 and Comparative Examples 1 to 5, the batteries of Examples 4 to 7 and Comparative Example 6 were each determined for the number of cycles before the decline to less than half the initial discharge capacity. The results, along with that of Example 1, are listed in Table 2 as below.

TABLE 2

|  | atomic ratio | | | |
| --- | --- | --- | --- | --- |
|  | Li | B | Mn | number of cycles |
| example 4 | 0.505 | 0.01 | 1 | 50 |
| example 5 | 0.51 | 0.02 | 1 | 52 |
| example 1 | 0.53 | 0.06 | 1 | 55 |
| example 6 | 0.55 | 0.10 | 1 | 58 |
| example 7 | 0.60 | 0.20 | 1 | 60 |
| comparative example 6 | 0.50 | 0 | 1 | 21 |

As apparent from the results, the lithium batteries of Examples 1, 4 to 7 have attained greater improvement in the charge/discharge cycle performance with notable increase in the number of cycles before the decline to less than half the initial discharge capacity, as compared to that of Comparative Example 6. Examples 1, 4 to 7 used the positive-electrode active material of boron-containing lithium-manganese complex oxide containing boron in the atomic ratio (B/Mn) of 0.01 to 0.20, whereas Comparative Example 6 used the positive-electrode active material free of the boron compound.

Examples 8 to 19

Examples 8 to 19 were different from Example 1 only in the type of solvent used for the nonaqueous electrolyte. As shown in Table 3 below, Example 8 used a solvent mixture of ethylene carbonate (EC) and 1,2-dimethoxyethane (DME); Example 9 used a solvent mixture of butylene carbonate (BC) and 1,2-dimethoxyethane (DME); Example 10 used a solvent mixture of vinylene carbonate (VC) and 1,2-dimethoxyethane (DME); Example 11 used a solvent mixture of γ-butyrolactone (γ-BL) and 1,2-dimethoxyethane (DME); Example 12 used a solvent mixture of sulfolane (SL) and 1,2-dimethoxyethane (DME); Example 13 used a solvent mixture of propylene carbonate (PC) and 1,2-diethoxyethane (DEE); Example 14 used a solvent mixture of propylene carbonate (PC) and 1,2-ethoxymethoxyethane (EME); Example 15 used a solvent mixture of propylene carbonate (PC) and tetrahydrofuran (THF); Example 16 used a solvent mixture of propylene carbonate (PC) and dioxolane (DOXL); Example 17 used a solvent mixture of propylene carbonate (PC) and dimethyl carbonate (DMC); Example 18 used a solvent mixture of propylene carbonate (PC) and diethyl carbonate (DEC); and Example 19 used a solvent mixture of propylene carbonate (PC) and ethylmethyl carbonate (EMC). In the respective examples, the respective ingredients were blended in a volume ratio of 1:1 for the preparation of the nonaqueous electrolyte.

Using the resultant nonaqueous electrolytes, batteries of Examples 8 to 19 were fabricated the same way as in Example 1.

Comparative Examples 7 to 20

Comparative Examples 7 to 20 were different from Example 1 only in the type of solvent used for the nonaqueous electrolyte. As shown in Table 3 below, Comparative Example 7 used a solvent of propylene carbonate (PC) alone; Comparative Example 8 used a solvent of ethylene carbonate (EC) alone; Comparative Example 9 used a solvent of butylene carbonate (BC) alone; Comparative Example 10 used a solvent of vinylene carbonate (VC) alone; Comparative Example 11 used a solvent of γ-butyrolactone (γ-BL) alone; Comparative Example 12 used a solvent of sulfolane (SL) alone; Comparative Example 13 using 1,2-dimethoxyethane (DME) alone; Comparative Example 14 used a solvent of 1,2-diethoxyethane (DEE) alone; Comparative Example 15 used a solvent of 1,2-ethoxymethoxyethane (EME) alone; Comparative Example 16 used a solvent of tetrahydrofuran (THF) alone; Comparative Example 17 used a solvent of dioxolane (DOXL) alone; Comparative Example 18 used a solvent of dimethyl carbonate (DMC) alone; Comparative Example 19 used a solvent of diethyl carbonate (DEC) alone; and Comparative Example 20 used a solvent of ethylmethyl carbonate (EMC) alone. Such solvents were used to prepare nonaqueous electrolytes of Comparative Examples 7 to 20.

Using the resultant nonaqueous electrolytes, lithium batteries of these comparative examples were fabricated the same way as in Example 1.

Similarly to Examples 1 to 3 and Comparative Examples 1 to 5, the batteries of Examples 8 to 19 and Comparative Examples 7 to 20 were each determined for the number of cycles before the decline to less than half the initial discharge capacity. The results, along with that of Example 1, are listed in Table 3 as below.

TABLE 3

|  | solvent in nonaqueous electrolyte (vol %) | number of cycles |
| --- | --- | --- |
| example 1 | PC:DME (1:1) | 55 |
| example 8 | EC:DME (1:1) | 53 |
| example 9 | BC:DME (1:1) | 51 |
| example 10 | VC:DME (1:1) | 48 |
| example 11 | γ-BL:DME (1:1) | 44 |
| example 12 | SL:DME (1:1) | 43 |
| example 13 | PC:DEE (1:1) | 45 |
| example 14 | PC:EME (1:1) | 49 |
| example 15 | PC:THF (1:1) | 42 |
| example 16 | PC:DOXL (1:1) | 41 |
| example 17 | PC:DMC (1:1) | 45 |
| example 18 | PC:DEC (1:1) | 44 |
| example 19 | PC:EMC (1:1) | 42 |
| comparative example 7 | PC | 25 |
| comparative example 8 | EC | 23 |

TABLE 3-continued

| | solvent in nonaqueous electrolyte (vol %) | number of cycles |
|---|---|---|
| comparative example 9 | BC | 22 |
| comparative example 10 | VC | 21 |
| comparative example 11 | γ-BL | 20 |
| comparative example 12 | SL | 20 |
| comparative example 13 | DME | 18 |
| comparative example 14 | DEE | 15 |
| comparative example 15 | EME | 15 |
| comparative example 16 | THF | 14 |
| comparative example 17 | DOXL | 12 |
| comparative example 18 | DMC | 16 |
| comparative example 19 | DEC | 15 |
| comparative example 20 | EMC | 15 |

As apparent from the results, the lithium batteries of Examples 1, 8 to 19 have attained greater improvement in the charge/discharge cycle performance with notable increase in the number of cycles before the decline to less than half the initial discharge capacity, as compared to those of Comparative Example 7 to 20. Examples 1, 8 to 19 used the solvent mixture containing at least one organic solvent selected from the group consisting of ethylene carbonate, propylene carbonate, butylene carbonate, vinylene carbonate, γ-butyrolactone and sulfolane and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate. On the other hand, Comparative Examples 7 to 20 used the solvent of a single component for the nonaqueous electrolyte.

According to a comparison among the batteries of Examples 1, 8 to 19, even greater improvement in the charge/discharge cycle performance is achieved by Example 1 using the solvent mixture of propylene carbonate and 1,2-dimethoxyethane, Example 8 using the solvent mixture of ethylene carbonate and 1,2-dimethoxyethane and Example 9 using the solvent mixture of butylene carbonate and 1,2-dimethoxyethane, the examples presenting the further increased numbers of cycles before the decline to less than half the initial discharge capacity. Particularly, the battery of Example 1 using the solvent mixture of propylene carbonate and 1,2-dimethoxyethane has accomplished the best charge/discharge cycle performance.

Examples 20, 21 and Comparative Examples 21, 22

In the fabrication of positive electrodes, Examples 20, 21 and Comparative Examples 21, 22 used the same ingredients for positive-electrode active material as in Example 1. That is, lithium hydroxide LiOH, boron oxide $B_2O_3$, and manganese dioxide $MnO_2$ were blended in the atomic ratio (Li:B:Mn) of 0.53:0.06:1.

As shown in Table 4 below, the resultant mixture was heat-treated at 150° C. in Example 20, at 250° C. in Example 21, at 500° C. in Comparative Example 21 and at 850° C. in Comparative Example 22. Except for this, the same procedure as in Example 1 was taken to fabricate the respective positive electrodes.

The resultant boron-containing lithium-manganese complex oxides were determined for the mean manganese valence the same way as in Example 1. As shown in Table 4, Example 20 presented a mean manganese valence of 3.90, Example 21 presented a mean manganese valence of 3.88, Comparative Example 21 presented a mean manganese valence of 3.60, and Comparative Example 22 presented a mean manganese valence of 3.50.

Using the resultant positive electrodes, lithium batteries of Examples 20, 21 and Comparative Examples 21, 22 were fabricated the same way as in Example 1.

Similarly to Examples 1 to 3 and Comparative Examples 1 to 5, the batteries of Examples 20, 21 and Comparative Example 21, 22 were each determined for the number of cycles before the decline to less than half the initial discharge capacity. The results, along with that of Example 1, are listed in Table 4 as below.

TABLE 4

| | heat-treatment temperature (° C.) | mean Mn valence | number of cycles |
|---|---|---|---|
| example 20 | 150 | 3.90 | 45 |
| example 21 | 250 | 3.88 | 50 |
| example 1 | 375 | 3.80 | 55 |
| comparative example 21 | 500 | 3.60 | 25 |
| comparative example 22 | 850 | 3.50 | 13 |

As apparent from the results, the boron-containing lithium-manganese complex oxides with the mean manganese valence of not less than 3.80 are attained by Examples 1, 20, 21 wherein the mixture of lithium hydroxide LiOH, boron oxide $B_2O_3$ and manganese dioxide $MnO_2$ was heat-treated at temperatures of 150° C. to 375° C. In contrast, Comparative Examples 21, 22, wherein the heat-treatment was performed at temperatures of over 500° C., provide the complex oxides with the mean manganese valence of less than 3.80.

In Examples 1, 20, 21 using the positive-electrode active materials with the mean manganese valence of not less than 3.80, the lithium batteries are dramatically improved in the charge/discharge cycle performance with notable increase in the number of cycles before the decline to less than half the initial discharge capacity, as compared with those of Comparative Examples 21, 22 using the positive-electrode active materials with the mean manganese valence of less than 3.80.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A lithium battery comprising a positive electrode comprising a positive electrode active material of a boron-containing lithium-manganese complex oxide, a negative electrode, and a nonaqueous electrolyte containing a solute and a solvent, wherein said positive-electrode active material is a boron-containing lithium-manganese complex oxide having an atomic ratio (B/Mn) of boron B to manganese Mn in the range of 0.01–0.20 and a predischarge mean manganese valence of not less than 3.80, wherein said solute in the nonaqueous electrolyte includes at least one substance selected from lithium trifluoromethanesulfonimide, lithium pentafluoroethanesulfonimide and lithium trifluoromethanesulfonmethide, wherein said solvent in the nonaqueous electrolyte is a solvent mixture containing
- at least one organic solvent selected from the group consisting of ethylene carbonate, propylene carbonate, vinylene carbonate, γ-butyrolactone and sulfolane, and
- at least one organic solvent selected from the group consisting of 1,2-dimethoxyethane, 1,2-diethoxyethane, 1,2-ethoxymethoxyethane, tetrahydrofuran, dioxolan, dimethylcarbonate, diethyl carbonate and ethylmethyl carbonate, wherein said solvent in the nonaqueous electrolyte does not contain butylene carbonate.

2. The lithium battery of claim 1, wherein said solute in the nonaqueous electrolyte is lithium trifluoromethanesulfonimide.

3. The lithium battery of claim 1, wherein said solvent in the nonaqueous electrolyte is a solvent mixture containing 1,2-dimethoxyethane and at least one organic solvent selected from the group consisting of propylene carbonate, and ethylene carbonate.

4. The lithium battery of claim 1, wherein said solvent in the nonaqueous electrolyte is a solvent mixture of propylene carbonate and 1,2-dimethoxyethane.

5. The lithium battery of claim 1, wherein said positive-electrode active material is a boron-containing lithium-manganese complex oxide obtained by heat-treating a mixture of a boron compound, lithium compound and manganese compound in the presence of oxygen, the mixture containing boron, lithium and manganese in an atomic ratio (B:Li:Mn) of 0.01–0.20:0.1–2.0:1.

6. The lithium battery of claim 5, wherein said heat-treatment is performed at temperatures of 150° C. to 430° C.

7. The lithium battery of claim 5, wherein said heat-treatment is performed at temperatures of 250° C. to 430° C.

8. The lithium battery of claim 5, wherein said heat-treatment is performed at temperatures of 300° C. to 430° C.

9. The lithium battery of claim 5, wherein said boron compound includes at least one compound selected from the group consisting of boron oxide $B_2O_3$, boric acid $H_3BO_3$, metaboric acid $HBO_2$, lithium metaborate $LiBO_2$ and quaternary lithium metaborate $Li_2B_4O_7$.

10. The lithium battery of claim 5, wherein said lithium compound includes at least one compound selected from the group consisting of lithium hydroxide LiOH, lithium carbonate $Li_2CO_3$, lithium oxide $Li_2O$ and lithium nitrate $LiNO_3$.

11. The lithium battery of claim 5, wherein said manganese compound includes at least one compound selected from the group consisting of manganese dioxide $MnO_2$ and manganese oxyhydroxide MnOOH.

12. The lithium battery of claim 1, wherein said negative electrode employs as a negative-electrode active material at least one substance selected from the group consisting of lithium metals, lithium alloys, carbon materials capable of absorbing and desorbing lithium ions.

13. The lithium battery of claim 1, wherein said negative electrode employs as a negative-electrode active material an alloy of lithium and aluminum.

* * * * *